United States Patent

Warren

[15] 3,652,333

[45] Mar. 28, 1972

[54] ENCAPSULATING COMPOSITION FOR ELECTRONIC CIRCUIT BOARDS AND PROCESS FOR APPLYING SAME

[72] Inventor: John M. Warren, Weatherford, Tex.

[73] Assignee: General Dynamics Corporation, Ft. Worth, Tex.

[22] Filed: Feb. 2, 1970

[21] Appl. No.: 7,912

[52] U.S. Cl. ..........................117/218, 117/75, 117/161 KP, 260/30.4 N, 260/31.2 N, 260/77.5 AN, 117/232

[51] Int. Cl. ..........................................B44d 1/42, H01b 3/30

[58] Field of Search ..............117/218, 232, 75, 161 KP, 212; 260/30.4 N, 77.5 AN, 31.2 N

[56] References Cited

UNITED STATES PATENTS

| | | | |
|---|---|---|---|
| 3,401,137 | 9/1968 | Finelli | 260/31.4 |
| 3,541,274 | 11/1970 | D'Cruz | 260/30.4 N |
| 3,252,944 | 5/1966 | Curtis | 117/232 |
| 3,206,330 | 9/1965 | Chottiner | 117/218 |
| 3,220,882 | 11/1965 | Lavin et al. | 117/218 |
| 3,385,732 | 5/1968 | Curran | 117/72 |
| 3,226,368 | 12/1965 | Reischl et al. | 117/161 KP |
| 3,415,768 | 12/1968 | Dieterich et al. | 260/67 TN |
| 3,440,086 | 4/1969 | Kerns | 117/161 KP |
| 3,491,053 | 1/1970 | Sommer et al. | 117/161 KP |
| 3,509,103 | 4/1970 | Teague et al. | 117/161 KP |

*Primary Examiner*—Murray Katz
*Assistant Examiner*—Raymond M. Speer
*Attorney*—Charles C. M. Woodward

[57] ABSTRACT

A process for applying a polyurethane gel composition for coating and encapsulating the electronic circuitry on a circuit board wherein the said composition consists essentially of an admixture of an elastomeric linear polyesterurethane of high molecular weight; a tetrahydrofuran intermediate monomer solvent and ethylene glycol monoethylether acetate, which composition is preferably sprayed over the object circuitry and onto the related electronic circuit board or other substrate as a vaporized gel of minute viscous globules which simultaneously forms a substantially uniform protective film over the substrate and encapsulates the circuit's conduit and conduit terminals as well as other protrusions, including elements having sharp points, knife edges and the like. This prime coat is then dried and may be subsequently followed by one or more dip coatings which are formed by immersion of the dried workpiece into a mixture of polymethyl methacrylate with a copolymer of ethyl acrylate/methyl methylacrylate.

5 Claims, 1 Drawing Figure

PATENTED MAR 28 1972
3,652,333
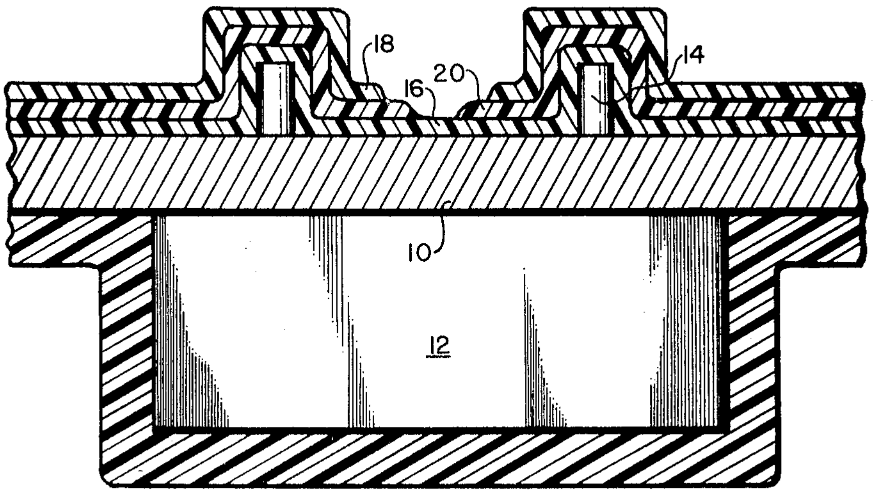
JOHN M. WARREN
INVENTOR
BY Charles E. Woodward
ATTORNEY

ENCAPSULATING COMPOSITION FOR ELECTRONIC CIRCUIT BOARDS AND PROCESS FOR APPLYING SAME

The invention herein described was made in the course of or under a contract or subcontract thereunder with the Department of the Air Force.

BACKGROUND OF THE INVENTION

1. Field of the Invention

The present invention relates generally to a composite film for protective encapsulation of electronic circuit boards and process for applying same.

More particularly, the invention resides in a composition of polyurethane gel and a process for applying the gel or alternately for applying the gel together with a subsequent finish coating to circuit boards and components thereof for protective shielding against dielectric leaks when such circuit boards and components are exposed to deleterious environmental conditions such as marasmatic foreign matter exemplified by aircraft fuels, hydraulic fluids, vapor, moisture and the like, and by environmental service temperatures ranging between −80° and 185° F.

PRIOR ART

In the present state-of-the-art, the closest approach to the instant composition and process applying to circuit boards for protective encapsulation thereof is exemplified by the polyurethane compound and process described in U.S. Pat. No. 3,440,086 and to a lesser extent in U.S. Pat. Nos. 3,385,732; 3,378,531; 3,415,768 and 3,385,829.

Other polyurethane compositions heretofore known to the art have been employed as protective coatings and encapsulating materials on circuit boards, which upon being heated to a given temperature fuse and become thermoset and thus are substantially infusible and insoluble thereafter. Such coatings make it very impractical if not impossible to repair connections and broken conduit or to change the circuitry once the coating has been applied. The first above noted U.S. Pat. No. 3,440,086 relates to a polyurethane precursor-viscosity builder and curing agent coating composition and method for applying same to a substrate. The present invention distinguishes over this patent both as to composition and method of application, and it is to be particularly noted that the patented system depends entirely upon a chemical reaction to control flow over the object substrate. The present composition, being already polymerized, requires no chemical reaction to effect flow control. Very accurate flow control is predetermined in the present invention and effected by combining solvents and thinner to obtain precise viscidity control in the gelling of the composition.

U.S. Pat. Nos. 3,385,732; 3,378,531; 3,415,768 and 3,385,829 relate to the present disclosure only by virtue of the fact that each involves either a polyurethane composition or to processes for preparing various polyurethane plastics. None of these compositions or processes are anticipatory of the present invention but perhaps might be loosely considered to be somewhat representative of the type of polyurethanes that are capable of being converted into gels.

Other known conventional coatings currently employed as protective circuit board encapsulation, in addition to those evident in the published art, include epoxy resins such as epoxy polyamids, non-soluble silicones and polymerized polyurethanes. Such coating materials upon being applied over wires, sharp-pointed protrusions or knife-edged elements will, because of their flow characteristics and surface tension effect "slump" downwardly or flow from the apex of such a protrusion (i.e., away from anything, particularly metallic components with high contact angles) until only a membrane of little protective consequence remains, or more often than not, the film will stretch thin and rupture, thus exposing the sharp profile and resulting in electrical leakage or discharge. Consequently, in order to achieve adequate dielectric protection for the circuitry by ultimately covering these sharp profiles, when using such coating solutions resort is made to application of multiple dip coats which in turn result in an extremely thick and heavy laminate building up elsewhere on the object circuit board, as on the flats of the substrate. This adds undesirable weight to airborne circuit boards where weight is always at a premium. Further, these thick resinous films lose transparency and preclude visual inspection of the coated circuits while also deterring dissipation of heat that is generated during energized operation of the circuits. Additionally, such thick compositions employed from necessity result in a coating that is extremely resistant to the removal of either all or a portion thereof for purposes of repairing or replacing circuitry, in most instances rendering repair impossible or highly impractical. Obviously appreciable increases in process and other costs result whenever such excessive quantities of coating materials are required to build sufficient film thicknesses over the points and edges of circuit protrusions to afford adequate shielding therefor.

The presently invented encapsulating material is of such physical character that components having high contact angles such as the needle-like protruding points and terminals of board circuitry resultant from soldering, as well as other sharp corners and knife-like edges, may be readily coated with the novel polyurethane which has considerably higher dielectric properties than those formerly known, and is preferably used in a gel condition wherein the vapor spray is comprised of a mist of minute viscous globules of flaccid gelled particles of sufficient viscosity that they have substantially no tendency to lapse, sag, slide or flow from the apices of such sharply acute protrusions, thus rendering only one coat sufficient, and providing a substantially uniform coating over the entire coated surface.

It is therefore an object of the present invention to provide a unique polyurethane resin composition and process for applying same to a substrate for the purpose of imparting an impervious and stable film-like protective shield thereover, thus precluding dielectric leakages, particularly from the apices of sharp terminals and the like.

Another object of the invention is the provision of a moisture impervious and dielectrically shielded electronic circuit board and process for making same.

A further object is to provide a novel strippable polyurethane gel composition and process for applying the gel to a substrate in the form of a vapor spray of minute, flaccid yet viscous globules that have the efficacy, in composite, to blanket spicular terminals or sharp apices of any acute protrusions yet is sufficiently viscid in character as to preclude any appreciable gel effluency or resultant emaciation of the protective film over a point or sharp edge.

A still further object resides in the provision of an encapsulated electrical device and a method for fabricating same, which device is hermetically sealed against adverse environmental conditions, shielded against dielectric leaks throughout a wide range of temperatures, impervious to moisture and vapor while remaining structurally stable under marasmatic attacks by hydraulic fluids, engine fuels, oils and the like.

These and other objects and advantages of the invention will become more apparent to those skilled in the art upon consideration of the following description of the appended drawings of the preferred embodiment, wherein:

FIG. 1 is an enlarged detail view partially in section of a portion of a substrate, circuitry and terminals illustrative of structures to which the conformal coating of the invention may be applied, portions thereof being exaggerated for purposes of clarity.

The operable scope of the present polyurethane composition, resulting in light to heavy gels within the range of consistencies suitable for spray application to a substrate, such as the electronic circuit board illustrated in the FIGURE, is compounded as follows:

| Polyurethane Gel | Parts by Weight |
| --- | --- |

| | |
|---|---|
| Elastomeric, linear polyesterurethane | 10–60 |
| Tetrahydrofuran | 25–150 |
| Ethylene glycol monoethylether acetate | 100–500 |

It is preferable to dissolve the elastomeric linear polyesterurethane in tetrahydrofuran prior to the addition of the remaining thinners. Each composition is then thoroughly blended, as by agitation, and placed in a closed container not subject to agitation for approximately 2 hours in order that the solution may congeal to the consistency necessary for optimum airless spray application.

The circuit board to be processed is then cleaned in a suitable solvent, such as trichloroethane, and allowed to dry. The board is then coated with the polyurethane gel, dried at either room temperature of force dried and may then be given one or more dip coats of moisture curing polyurethanes or amine curing epoxies, each coat being dried prior to application of following coats.

In the preferred form, the polyurethane gel composition is formulated as follows:

| Polyurethane Gel | Parts by Weight |
|---|---|
| Elastomeric, linear polyesterurethane | 30 |
| Tetrahydrofuran | 70 |
| Ethylene glycol monoethylether acetate | 350 |

The good dielectric quality as well as imperviousness to liquids such as water and to humid vapor is given to the composition by the character of the elastomeric, linear polyesterurethane ingredient (an example of which is the B. F. Goodrich Company ESTANE 5740*x071*) which characteristics may be subsequently further enhanced by additional dip coats in acrylic compositions, moisture curing polyester and polyether polyurethanes or amine curing epoxies, as hereinafter described.

The flaccid and viscid character of the resultant polyurethane gel is derived in part from ethylene glycol monoethylether acetate which is a polar solvent imparting the requisite coalescence and tenacity to the elastomeric linear polyesterurethane-tetrahydrofuran solution, permitting mechanical vaporization of the gelled composition upon its being passed through a spray gun of the type having the porting orifice of its nozzle in registry with a V-slot and in such manner that the fluid being ejected is mechanically or physically atomized to form spray effluvium without the need for aeration.

Referring now to the FIGURE there is shown for purposes of illustration a circuit board substrate 10, having circuit defining components 12 positioned on one side thereof, which components have contact elements or leads 14 extending through the board 10, the contact elements 14 being properly connected to other components (not shown) by conductive conduits (not shown) through means well known in the art, as for example soldering. Obviously, the circuit board need not be the particular form shown, since the invention is applicable to printed circuits or electronic or electrical circuit components of all types, the form illustrated being herein chosen because it is one of the most difficult to properly protect against dielectric leakage. The thermoplastic, sprayed-on polyurethane film is designated by the numeral 16 while the outer laminae or dip coatings of acrylic compositions, moisture curing polyurethanes or amine curing epoxies selectively deposited as hereinafter described are designated by the numerals 18 and 20. The latter laminae have been partially cut-away in the FIGURE for clarity in distinguishing between the two part coating system, i.e., the sprayed-on polyurethane gel coating 16 and the one or more dip coatings 18 and 20. It is also, of course, obvious that more than one polyurethane film coating 16 may be applied, but experience has indicated that one is entirely satisfactory because of the excellent properties of the coating of the invention not achievable in the prior art.

Having prepared the polyurethane composition as heretofore described and permitted it to congeal, a bellows bladder is next filled with the gel and deposited within the upper cylinder of an airless, pressure extruding pump. The circuit board, or other workpiece having been dip cleaned in trichloroethane or other suitable solvent and allowed to dry in open air, is thereupon sprayed and a thin protective film of the polyurethane gel composition deposited upon the substrate and over all conduits, circuit components and terminals.

The spray gel does not flow or sag and will dry to form a tough, continuous film over and about all exposed surfaces, knife edges and sharp points. This film is then permitted to dry at room temperatures or may be force dried by subjecting to heat for about 1 hour at 125° F. followed by about 30 minutes at 160° F.

In the preferred process the workpiece is next immersed in the following solution for about 30 minutes:

| Material | Parts by Weight |
|---|---|
| Polymethyl methacrylate (30% solids) | 100 |
| Copolymer-ethyl acrylate/methyl methylacrylate (40% solids) | 100 |

The workpiece is next removed from this dip solution and allowed to dry at room temperature for about 2 hours. It is thereupon dipped in the above solution for about one minute, removed from dip and permitted to dry.

In the second embodiment the above acrylic solution is omitted and a moisture curing, thermosetting polyurethane resin or an amine curing epoxy resin substituted therefor. Each of these resin immersions deposit an outer coat of translucent, thermosetting film which is exceptionally hard and thermally stable but has the disadvantages of being substantially insoluble in stripping solvent. The amine curing epoxies are somewhat harder and more brittle than the moisture curing polyurethanes and are also substantially insoluble in conventional stripping solvents.

SUMMARY OF THE INVENTION

A polyurethane resin gel composition and process for applying minute, flaccid yet viscous globules of the resultant gelled substance onto an electronic circuit board or other substrate having appendages, such as conduit and terminals thereon which result in various spicular protrusions having sharply acute apices or other configurations which define sharp knife edges or the like, thereby providing a coalescent, encapsulating film or coating over and about the object substrate and over all related protrusions for shielding against marasmatic fluids, such as oil, fuel and moisture as well as against resultant dielectric leaks throughout an environmental service temperature range of −80° through 185° F.

I claim:

1. The process for the protective encapsulation and shielding against electrical leakage of an electronic circuit board, comprising, in combination, the steps of:
   a. applying a polyurethane gel composition over and about the circuit-defining elements and substrate of said electronic circuit board in which comminuted gel globules are electrically nonconductive and are further characterized by their thixotropic coalescence, flaccidity, tenacious surface affinity for other materials, imperviousness to liquids, light transparency, solubility and by their excellent thermal stability; said gel composition being a congealed solution consisting essentially of:
      1. an elastomeric, linear polyester-urethane of high molecular weight within the range of from about 10 parts by weight to about 60 parts by weight;
      2. a tetrahydrofuran intermediate monomer solvent within the range of from about 25 to about 150 parts by weight; and 3. a thixotropic ethylene glycol monoethylether acetate, as a congealing agent, within the range of from about 100 parts to about 500 parts by weight;

b. curing the encapsulating polyurethane gel composition.

2. The process for application of a protective encapsulating film about an electronic circuit board of claim 1, including in addition, applying at least one outer coating of a thermoplastic resin which is readily soluble in a relatively mild stripping solvent such as in a solution of 25 percent dimethylacetamide and 75 percent methyl-ethyl-ketone, by immersing the circuit board at least once in a solvent soluble, thermoplastic acrylic composition comprising a polymethyl methacrylate in a substantially balanced solution with a copolymer of ethyl acrylate/methyl methylacrylate; the ingredients entering solution equally at about 100 parts of each, by weight.

3. The process of claim 2, comprising in addition; applying a second exterior coat of thermoplastic acrylic resin, which is readily removable by a stripping solvent, by the additional steps of:

a. drying said first applied outer coating of thermoplastic acrylic;

b. re-immersing the circuit board in said thermoplastic acrylic solution;

c. drying the resultant secondly applied exterior coating.

4. The process for application of a protective encapsulating film about an electronic circuit board of claim 1, including in addition, applying at least a second exterior coating of a thermosetting resin which is substantially insoluble in a conventional, relatively mild solvent such as in phenol/methylene chloride, by:

a. immersing the circuit board, at least once, in a relatively insoluble, thermosetting, moisture curing polyurethane resin;

b. drying the resultant dip coat of moisture curing polyurethane, and c. curing the resultant encapsulating materials.

5. The process for application of a protective encapsulating film about an electronic circuit board of claim 1, including in addition, applying at least a second exterior coating of a thermosetting resin which is substantially insoluble in a conventional, relatively mild solvent such as in phenol/methylene chloride, by:

a. immersing said object circuit board at least once in a relatively insoluble, thermosetting amine curing epoxy resin;

b. drying the resultant coating; and c. curing the resultant encapsulating materials.

* * * * *